J. F. CHAUVIN.
PNEUMATIC TIRE.
APPLICATION FILED SEPT. 22, 1916.
1,225,770.
Patented May 15, 1917.
2 SHEETS—SHEET 1.
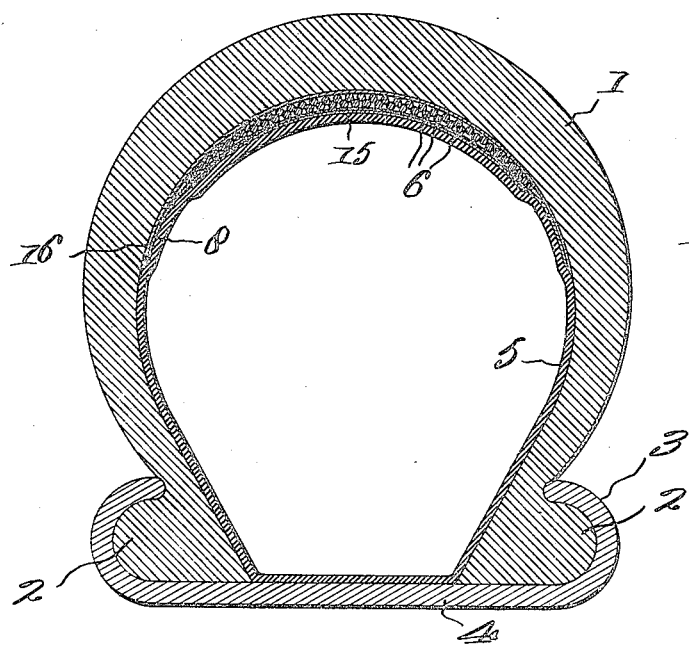
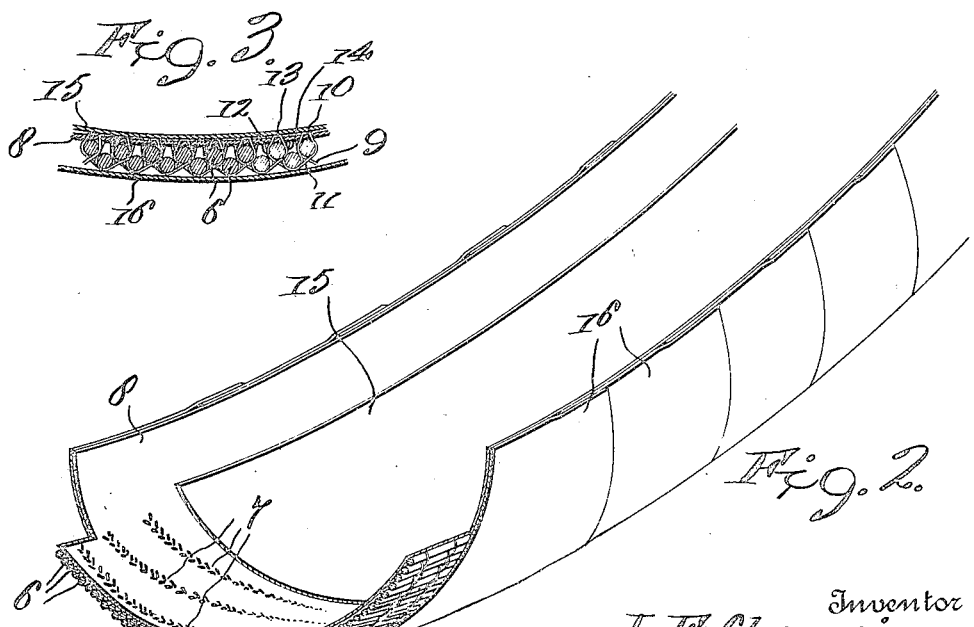
Witnesses
Edwin J Beller
P J Mawhinney
Inventor
J. F. Chauvin,
by Wilkinson, Ginsta McKay.
Attorneys.

J. F. CHAUVIN.
PNEUMATIC TIRE.
APPLICATION FILED SEPT. 22, 1916.

1,225,770.

Patented May 15, 1917.
2 SHEETS—SHEET 2.

Witnesses
Edwin Beller.
R. J. McWhinney.

Inventor
J. F. Chauvin,
by Wilkinson, Guesta Mackay
Attorneys.

UNITED STATES PATENT OFFICE.

JAMES FARQUHARD CHAUVIN, OF HOUMA, LOUISIANA, ASSIGNOR TO CAMPBELL P. JONES, OF HOUMA, LOUISIANA.

PNEUMATIC TIRE.

1,225,770.  Specification of Letters Patent.  Patented May 15, 1917.

Application filed September 22, 1916. Serial No. 121,629.

*To all whom it may concern:*

Be it known that I, JAMES FARQUHARD CHAUVIN, a citizen of the United States, residing at Houma, in the parish of Terrebonne and State of Louisiana, have invented certain new and useful Improvements in Pneumatic Tires; and I do hereby declare the following to be a full, clear, and exact description of the invention, such as will enable others skilled in the art to which it appertains to make and use the same.

The present invention relates generally to improvements in pneumatic tires and more specifically to a tire reinforce which may be either included as one of the laminæ in building up the tire shoe, or be made independently in the form of a reliner or boot and removably fitted within the tire shoe between the tread and inner tube.

I have experimented largely with tire reinforces in which mesh wire, metal and other plates, and fabric armor of various kinds, were used, but such constructions have been found impractical for several reasons, chief among which is probably the fact that the same are not sufficiently resilient and elastic as to regain their proper shape after being deformed from running on them in deflated tires. Prior devices also readily permit puncturing and have a tendency to cut both shoe and inner tube.

It is the primary object of the present invention to provide an improved tire reinforce which will be effective to protect the inner tube against possible puncturing and one which will not be attended by the disadvantages above pointed out.

In the accompanying drawings forming a part of this application, and in which similar reference symbols indicate corresponding parts in the several views:

Figure 1 is a cross-sectional view through a tire showing a reliner therein constructed in accordance with my invention;

Fig. 2 is a fragmentary perspective view of the reliner with the parts broken away at one end;

Fig. 3 is enlarged fragmentary sectional view of the same;

Figure 4:
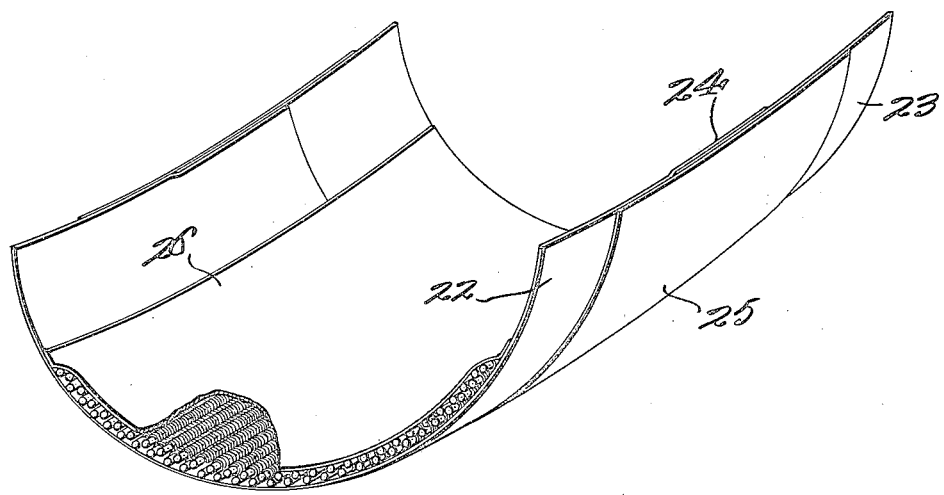
Fig. 4 is perspective view of a boot made according to the present invention and partially broken away; and, Fig. 5 is an enlarged end view showing the rods and method of stitching.

Referring more particularly to the drawings and for the present to Figs. 1 to 3, 1 designates a tire shoe having the usual beads 2 for engaging the flanges 3 of the clencher or other rim 4. At 5 is indicated the inner tube, the same being of any approved form.

Between the inner tube 5 and tread portion of the shoe 1 is located a reliner, which may extend only beneath said tread as shown in Fig. 1 or made of sufficient width to embrace the sides of the shoe 1 and protect against laterally-received punctures.

This improved reliner is built up of a series of circumferentially-extending resilient metal reinforcing elements; preferably the rods 6, shown, suitably secured together, as by the transverse spaced rows of stitching 7. The thread used in this stitching is of linen, cotton, or other thread suitable for the purpose.

It is advantageous that the rods be arranged to overlap, for which more particularly see Fig. 3 especially at the tread where the puncturing thrusts are received at substantially right angles to the reliner or protector. As appears in Figs. 1 and 2 the rods 6 may be in a single row along the sides as but glancing blows are struck at this portion of the protector and the rounded character of the rods has a tendency to divert the points of the obstacles away from the inner tube. At the tread however the obstacle will encounter the rods at right angles and tend to pry same apart, entering therebetween. By having the overlapping structure with the rods disposed in double rows offset with respect to each other, the rods of the inner row will prevent the obstacle which has entered between adjacent rods of the outer row from proceeding farther into the tire.

In order to insure thorough protection it is essential to have the rods secured against transverse displacement, and this may be accomplished in a variety of ways, one of which is by the stitching 7 above referred to. This stitching 7 also, preferably, serves the purpose of attaching a backing 8 to the rods. Such backing 8 is of flexible canvas or other suitable material and is so sewed to the rods 6 as to hold them in a transverse arc conforming substantially to the curvature of the shoe 1.

An effective method of stitching is shown in the enlarged section (Fig. 3) wherein the thread 9 is first passed to one side of one of the rods of the inner row, through the backing 8, as indicated at 10, and returned to the opposite side of said rod; the thread being then directed where shown at 11 beneath the next adjacent rod of the outer row; thence to the far side of the proximate rod in the inner row as appears at 12. The stitching is thereupon disclosed at 13 to be threaded through the backing 8, and at 14 to be passed about the rear side of said rod. This method is followed across the protector.

A lining 15 is secured by adhesive or otherwise to the inside of the backing 8 to present a smooth surface to the inner tube 5; the lining being of canvas or other material found adapted for this purpose.

There is also preferably a covering affixed to the outside of the rods 6, which is illustrated in the drawings to be composed of overlapping strips 16 disposed cross-wise, or lengthwise. These strips are of appropriate material and are cemented or otherwise applied.

The several parts above described unite to form a unitary structure which obviously may be included as a lamina in the construction of the shoe 1 or be used as a reliner in the manner shown. Such protector, whether it be a reliner or insert in the tread of the shoe may be formed in a continuous circle or have its ends divided and overlapped when put in place.

Figure 5:
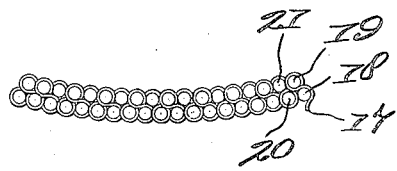

Turning now to Figs. 4 and 5, I have here shown a boot or blow-out patch constructed in general similar to the reliner but being modified in dispensing with the backing, and in arranging the rows of stitching contiguous.

The rods are first assembled in the overlapping relation shown in Fig. 5 and bound together by the inelastic thread 17, which is wound initially about the end rod 18 of the outer row and from there carried around the end rod 19 of the inner row. The second rod 20 of the outer rod next receives the thread 17 and thence it is passed to and about the rod 21 second in the inner row. It will be noted that the thread is carried in each instance to the far side of the rods and wound backwardly to embrace the rear side; and this method is continued to include as many rods as are found necessary for the particular boot. The rods may also be assembled in single rows, thereby making a lighter fabric if desired, or two or more layers of this lighter fabric may be cemented together if desired.

An outer covering is secured by cementing or other means over the assembled rods; such covering consisting advantageously of the transverse strips 22 and 23 overlapped at 24 and having the joint concealed beneath a third strip 25. A lining 26 is also preferably attached inside the shoe to protect the inner tube from the uneven surface presented by the stitching 17.

It is to be understood that either the boot or reliner may be formed in accordance with either modification shown and described or be otherwise slightly varied: and the same affords a practically impenetrable protector which may be run upon with the tires in the deflated condition without injury and without so deforming same as to prevent its restoration to original shape when the inner tube is inflated.

It will be obvious that various modifications might be made in the herein described apparatus and in the construction, combination and arrangement of parts which could be used without departing from the spirit of my invention.

Having thus described my invention, what I claim and desire to secure by Letters Patent of the United States, is:

1. A tire protector of the character described including a series of round resilient rods extending circumferentially of the tire and forming an outer row, a second series of similar rods extending circumferentially and forming a second inner row, such rods of the second row being disposed opposite the spaces between the rods of the outer row, substantially inelastic stitching wound alternately about the adjacent rods of both inner and outer rows for securing the rods against transverse displacement, a covering extending over the outer faces of the outer row of said rods, and a lining placed over the inner faces of the inner row, substantially as described.

2. A tire protector of the character described including a series of round resilient rods extending circumferentially of the tire and forming an outer row, a second series of similar rods extending circumferentially and forming a second inner row, such rods of the second row being disposed opposite the spaces between the rods of the outer row, substantially inelastic stitching wound alternately about the adjacent rods of both inner and outer rows for securing the rods against transverse displacement, a covering composed of a series of transversely extending strips having their ends overlapped and placed over the outer faces of the outer row of said rods, other strips placed over and concealing the joints of the overlapping ends of said first mentioned strips, and a lining covering the interior faces of the inner row of said rods and secured at its ends to said covering, substantially as described.

In testimony whereof, I affix my signature.

JAMES FARQUHARD CHAUVIN.